No. 766,010. PATENTED JULY 26, 1904.
L. ZELENKA.
CYCLE.
APPLICATION FILED OCT. 13, 1903.
NO MODEL. 2 SHEETS—SHEET 1.
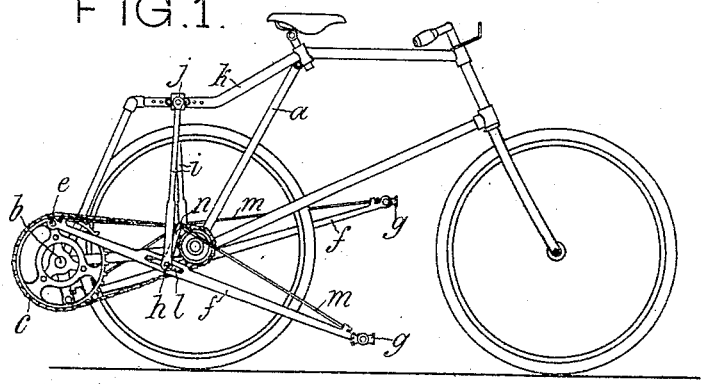
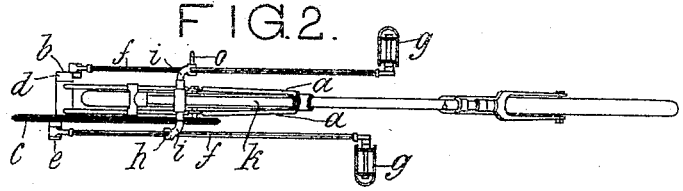
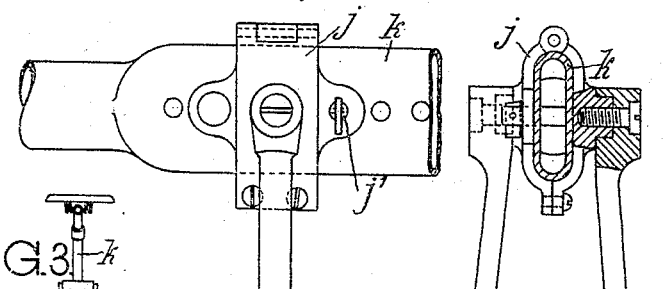
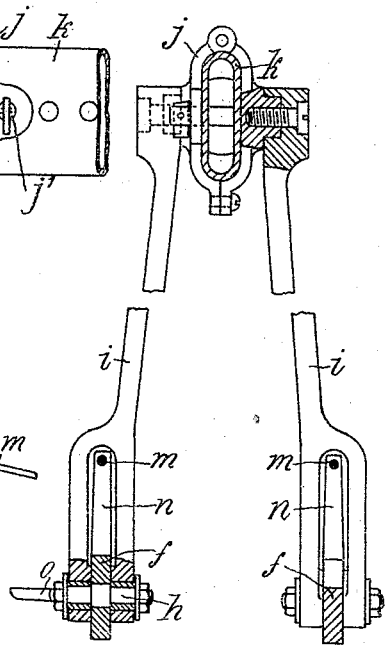
WITNESSES
Wm. Kuehne
John A. Percival
INVENTOR
Leopold Zelenka
BY Richards & Co
ATTORNEYS No. 766,010. PATENTED JULY 26, 1904.
L. ZELENKA.
CYCLE.
APPLICATION FILED OCT. 13, 1903.
NO MODEL. 2 SHEETS—SHEET 2.

WITNESSES
INVENTOR
Leopold Zelenka
BY
ATTORNEYS

No. 766,010. Patented July 26, 1904.

UNITED STATES PATENT OFFICE.

LEOPOLD ZELENKA, OF MISTEK, AUSTRIA-HUNGARY.

CYCLE.

SPECIFICATION forming part of Letters Patent No. 766,010, dated July 26, 1904.

Application filed October 13, 1903. Serial No. 176,902. (No model.)

*To all whom it may concern:*

Be it known that I, LEOPOLD ZELENKA, a subject of the Emperor of Austria-Hungary, residing at Mistek, Moravia, in the Empire of Austria-Hungary, have invented new and useful Improvements in Cycles, of which the following is a specification.

My invention relates to cycles, and comprises driving mechanism whereby the transmission is effected through the agency of pedal-levers, provision being made for varying the length of the pedal-lever arms and also the points of suspension for the pendulum-rods of such levers. By the adjustability of the levers the rate of transmission may be adapted—for instance, in the case of luggage-carriers—to the weight to be transported by the cycle, so that with a light weight a great speed may be attained and that conversely with a small speed a heavy weight may be carried, the product of the weight into the speed remaining practically the same within certain limits.

In the accompanying drawings I have shown a bicycle provided with the improved driving mechanism.

Figure 6:
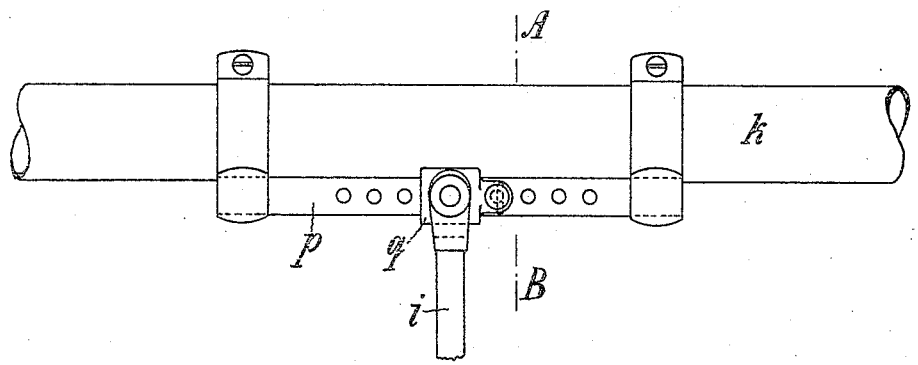
Figure 7:
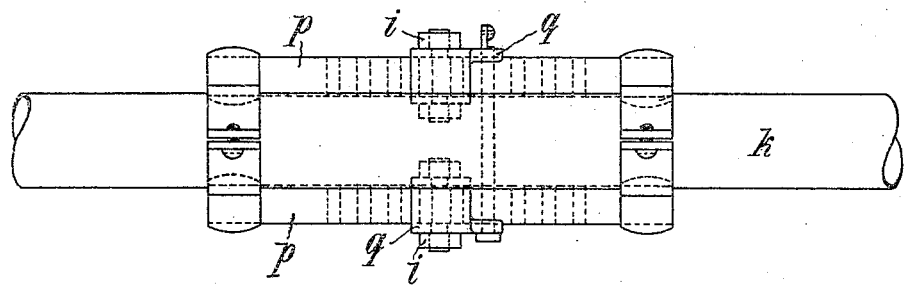
Figure 8:
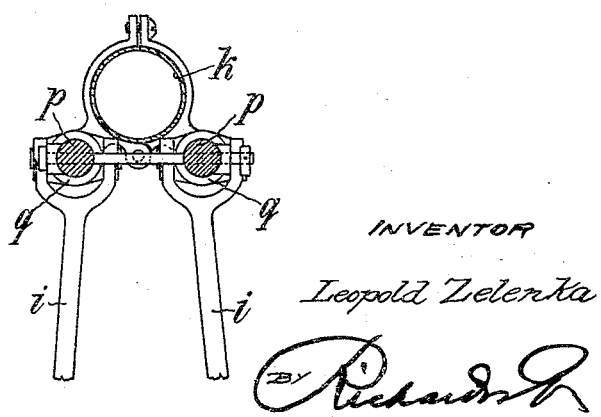

Figure 1 is a side elevation, Fig. 2 a plan, and Fig. 3 a rear elevation, of the machine. Fig. 4 is a side elevation, and Fig. 5 a rear elevation, partly in section, showing the arrangement of the pendulum-rods. Fig. 6 is a side elevation of a modified device for adjusting the upper end of the pendulum-rods on the rear frame-tube. Fig. 7 is a plan view of the same, and Fig. 8 is a section on line A B of Fig. 6.

The frame $a$ of the bicycle has at its rear end a bracket fixed to the top frame-tube and to the back-fork ends and carrying at the rear of the back wheel a bearing for a short shaft $b$, which has secured upon it at one end a driving sprocket-wheel $c$ and at the other end a crank $d$. To a crank-pin $e$, fixed to the sprocket-wheel $c$ and to the pin on the crank $d$, are pivoted two levers $f$, carrying at their free ends the pedals $g$. The levers $f$ are connected by bolts $h$ with the lower forked ends of pendulum-rods $i$, the upper ends of which are pivoted to a sliding piece $j$, which can be adjusted on the top frame-tube $k$, extending over the back wheel.

In order to obtain a sure hold for the sliding piece $j$, a portion of the frame-tube $k$ is flattened and furnished with a row of holes corresponding to those in the sliding piece $j$, which may thus be fixed at different points of the frame-tube $k$ by means of a bolt $j''$, Fig. 4. This adjustability is desirable, because the lower ends of the pendulum-rod $i$ can also be adjusted in a slot $l$ of the pedal-lever $f$ for the purpose of enabling the rate of transmission to be changed.

In order to render the pedal-levers $f$ as light as practicable, they are provided with a tension device consisting of a wire $m$, which passes over a distance rod or prop, placed in proximity to the said slot $l$, to the ends of the lever. The bolt at the lower end of the left pendulum-rod $i$ is furnished with a step $o$.

In lieu of pivoting the upper ends of the pendulum-rods $i$ to a sliding piece $j$, adapted to be adjusted on a flattened part of the top frame-tube, as set forth, I may also arrange, Figs. 5, 6, and 7, guide-rods $p$ on the side of the frame-tube $k$, small cross-heads $q$ for receiving the forked upper ends of the pendulum-rods $i$ being adapted to be displaced and fixed upon the said guide-rods $p$, as will be readily understood.

It is evident that the improved driving mechanism may be easily applied to old cycles.

What I claim as my invention, and desire to secure by Letters Patent, is—

1. In a cycle of the character described, a top frame-tube extending over the back wheel, a bracket fixed to the same and to the back-fork ends, a shaft held at the rear end of the bracket behind the back wheel, a driving sprocket-wheel and crank carried by this shaft, crank-pins fixed on the sprocket-wheel and crank, pedal-levers pivoted to these crank-pins, and pendulum-rods pivoted at their upper ends to the said top frame-tube and at their lower end to the pedal-levers, substantially as therein set forth.

2. In a cycle of the character described, a top frame-tube extending over the back wheel, a bracket fixed to the same and to the back-fork ends, a shaft held at the rear end of the bracket behind the back wheel, a driving sprocket-wheel and crank carried by this shaft, crank-pins fixed on the sprocket-wheel and crank, pedal-levers pivoted to these crank-pins and furnished with slots, bolts adjustably secured in these slots, and pendulum-rods pivoted at their upper ends to the said top frame-tube and at their lower ends to the bolts held in the said slots, substantially as herein set forth.

3. In a cycle of the character described, a top frame-tube extending over the back wheel and furnished with a row of holes, a bracket fixed to the same and to the back-fork ends, a shaft held at the rear end of the bracket behind the back wheel, a driving sprocket-wheel and crank carried by this shaft, crank-pins fixed to the sprocket-wheel and crank, pedal-levers pivoted to these crank-pins, a sliding piece adapted to be adjusted upon the said top frame-tube, a bolt passing through the sliding piece and one of the holes in this frame-tube, and pendulum-rods pivoted at their upper ends to the said sliding piece and at their lower ends to the pedal-levers, substantially as herein set forth.

4. In a cycle of the character described, a top frame-tube having part of it flattened at the sides and furnished with a row of holes, a bracket fixed to the same and to the back-fork ends, a shaft held at the rear end of the bracket behind the back wheel, a driving sprocket-wheel and crank carried by this shaft, crank-pins fixed to the sprocket-wheel and crank, pedal-levers pivoted to these crank-pins, a sliding piece adapted to be adjusted upon the flattened part of the said top frame-tube, and pendulum-rods pivoted at their upper ends to the said sliding piece, and at their lower ends to the pedal-levers, substantially as herein set forth.

In testimony whereof I have signed my name to this specification in the presence of two subscribing witnesses.

LEOPOLD ZELENKA.

Witnesses:
 EMERICH BONDI,
 ALVESTO S. HOGUE.